May 15, 1923.

A. P. HAMILTON

CLUTCH

Filed Nov. 11, 1919

A. P. HAMILTON

CLUTCH

Filed Nov. 11, 1919

Inventor—
Alexander P. Hamilton,
by his Attorneys.—
Howson & Howson

Patented May 15, 1923.

1,455,587

UNITED STATES PATENT OFFICE.

ALEXANDER P. HAMILTON, OF TROY, OHIO, ASSIGNOR TO POWELL EVANS, OF PHILADELPHIA, PENNSYLVANIA.

CLUTCH.

Application filed November 11, 1919. Serial No. 337,163.

*To all whom it may concern:*

Be it known that I, ALEXANDER P. HAMILTON, a citizen of the United States, residing in Troy, Ohio, have invented Clutches, of which the following is a specification.

One object of my invention is to provide a relatively simple device for adjusting the elements of a plate- or multi-ring friction clutch to take up lost motion or compensate for wear, which shall primarily be at all times visible and conveniently accessible;—the invention more particularly contemplating the provision of a single element for simultaneously adjusting the fulcrum pins or studs for the plate- or ring-actuating levers, which element shall be mounted on the outside of the clutch housing.

A further object of the invention is to provide a ring of novel construction especially adapted for simultaneously coacting with a plurality of the members controlling the relative operative positions of the plates or other coacting elements of a friction clutch, together with novel means whereby said ring may be maintained in any adjusted position.

These objects and other advantageous ends I attain as hereinafter set forth, reference being had to the accompanying drawings, in which, Fig. 1 is a longitudinal vertical section of a clutch embodying my invention;

Fig. 3 is a side elevation of the adjusting ring employed in my clutch;

Fig. 4 is a side elevation of a slightly modified form of adjusting ring and one of its associated coacting elements;

Fig. 7 is a longitudinal section of the adjusting ring utilized in Figs. 5 and 6, together with one of its cooperating pins.

Figure 1:
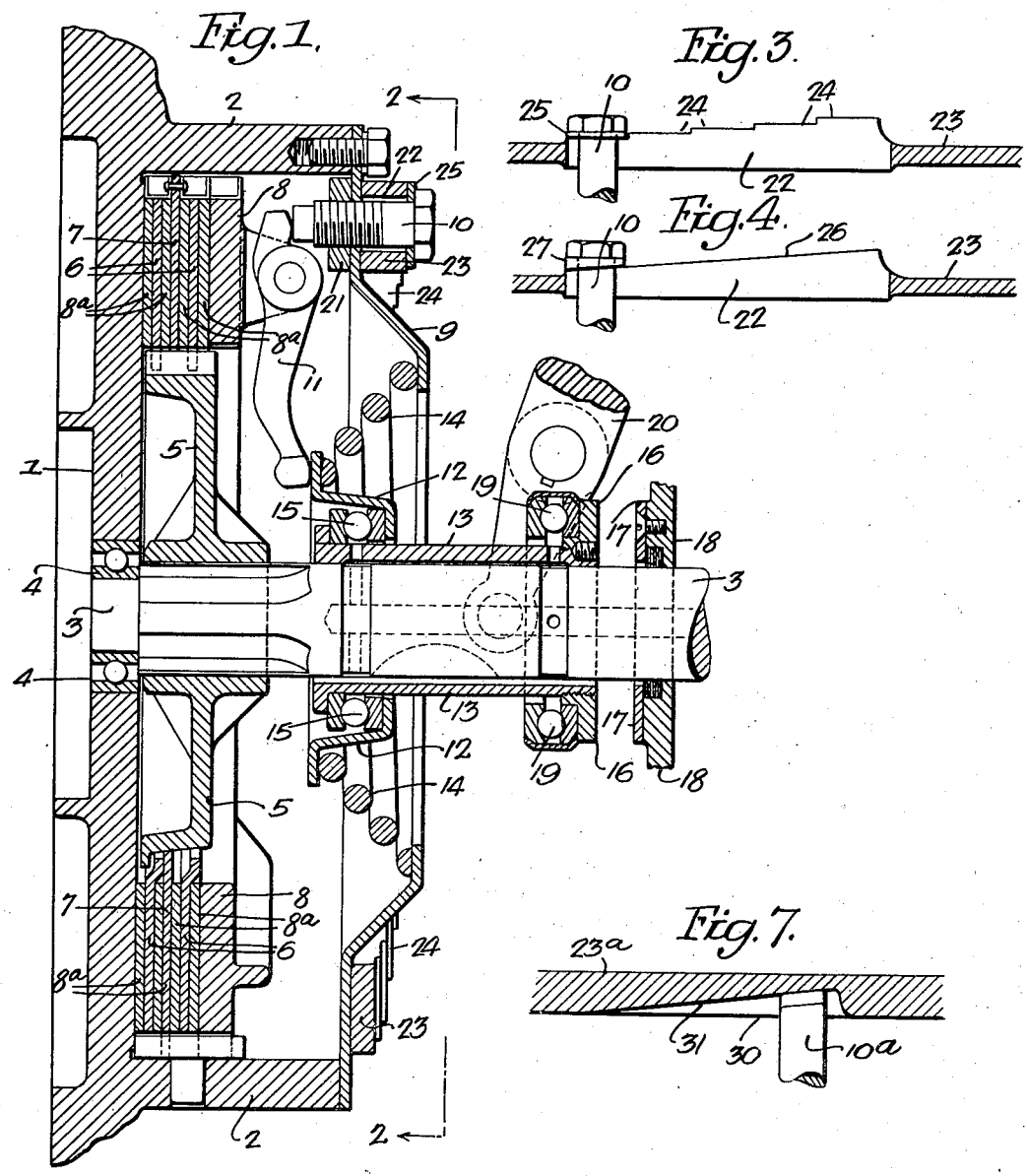
Figure 2:
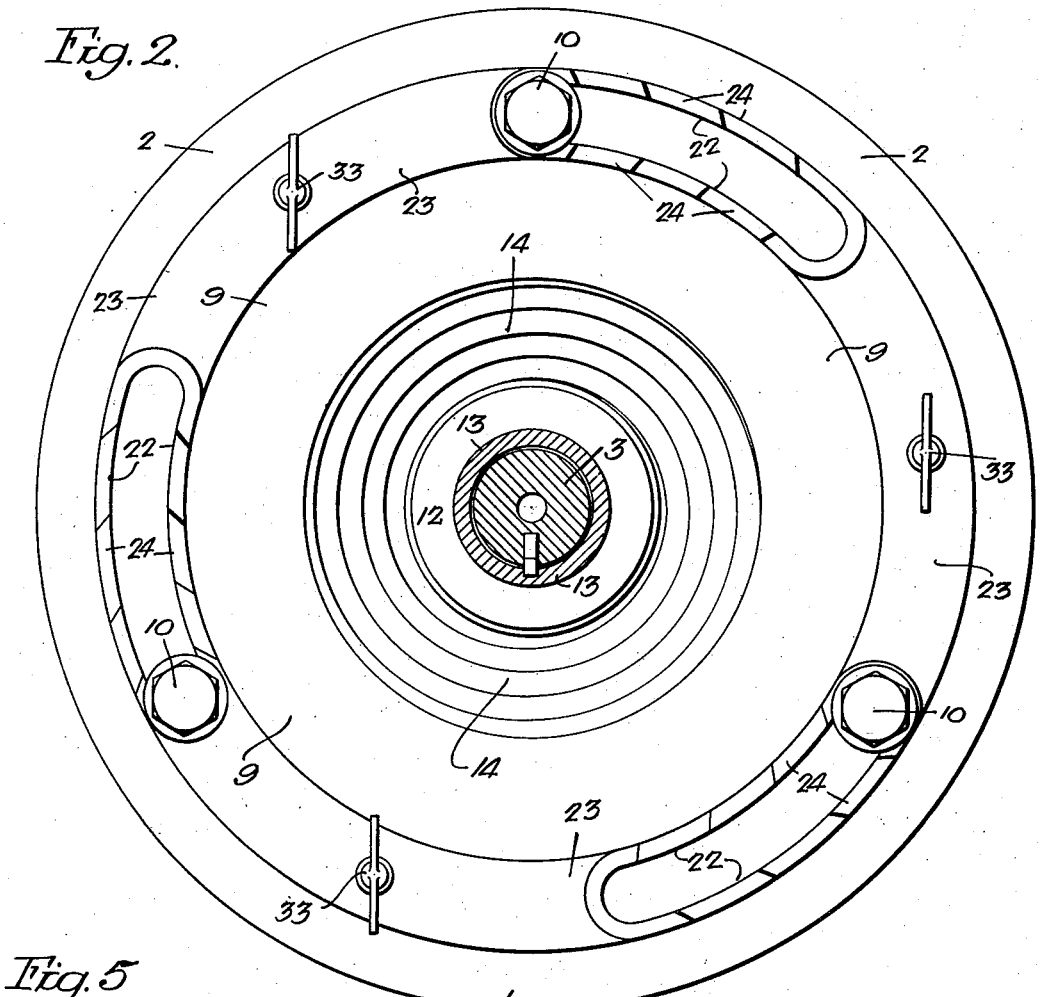
Fig. 2 is an end elevation partly in vertical section on the line 2—2, Fig. 1.

In Figs. 1 to 3 inclusive of the above drawings, 1 represents part of a fly wheel having a flat radial portion and including a cylindrical flange extension 2. Concentric with this fly wheel structure is a shaft 3 one of whose ends is supported through an anti-friction bearing 4 at the center of said fly wheel. This end adjacent the bearing is splined and has fixed to it a radially projecting plate 5 having a flange on which any suitable number of clutch plates or rings 6 are slidably keyed.

Within and slidably keyed to the cylindrical flanged portion 2 of the fly wheel which encloses the plates 6, is mounted a third clutch ring or plate 7 and a pressure plate or ring 8, of which the first lies between the plates 6 and the latter is adjacent the outer one of said plates. Interposed between each of these latter plates and the plate 7, as well as between them and the fly wheel 1 and pressure plate 8, are intermediate plates or rings 8ª independent both of the fly wheel and of the supporting plate 5.

Fixed by bolts or otherwise to the outer edge of the cylindrical extension 2 of the fly wheel is an inwardly extending cover plate 9 which serves to support any suitable number of threaded studs 10, in the present instance three, which extend parallel with the shaft 3 into the casing provided by the fly wheel and the cover plate 9, where they serve as fulcrums for a corresponding number of levers 11. These latter are radially mounted within said casing, in the present instance in positions 120° apart, and are pivoted to lugs projecting from the outer face of the pressure plate 8, while their inner ends bear upon a dished ring 12 mounted upon a sleeve 13, there being a spring 14 confined between this ring and the inner face of the cover plate 9.

Said sleeve 13 is splined to and longitudinally slidable upon the shaft 3 and extends into the clutch casing where its inner end has a flange between which and the inwardly flanged ring 12 is mounted an anti-friction bearing 15. The outer end of this sleeve has fixed to it a collar 16 designed to cooperate with a ring of friction material 17, mounted upon a relatively fixed structure 18 to constitute a brake and also engaged through an anti-friction bearing 19 with the clutch operating lever 20.

Each of the studs 10 has its outer end headed and is threaded for the reception of a suitable nut 21 non-rotatably held within the clutch casing. Between its head and the outer face of the cover plate 9 each of said studs passes through an elongated slot 22 in an adjusting ring 23 mounted upon said plate concentrically with the shaft 3. This ring on both sides of all of its slots is formed with a series of steps or cam faces 24 of progressively increasing height and the construction is such that in any given position of the ring, steps of the same height or thickness lie between the outer face of the cover plate 9 and the spring washers 25 under the head of each of the bolts. Obviously in place of the stepped construction shown in Figs. 1 to 3 inclusive, the ring may be formed with inclined cam portions 26 on either side of each of its slots 22 and each of the studs 10 may be provided with washers 27 of wedge shaped cross section formed to coact with these cam faces.

In any case when it is desired to take up lost motion in the clutch or to adjust the wear of any of the plates or rings 6—6, it is merely necessary to slack off all of the bolts 10 and thereafter rotate the ring 23 so that stepped portions of reduced but equal thickness are brought under the heads of each of its studs 10. The latter may then be set up as far as possible with the result that their ends are projected further into the casing than previously, and for equal distances. When now the members of the clutch are to be coupled or operatively connected, the lever 20 is so turned on its pivot as to allow the spring 14 to move the dished or flanged ring 12 toward the fly wheel. The inner or long arms of the levers 11 are thus likewise moved toward the fly wheel and since their short or outer arms engage the inner ends of the studs 10, the pressure plate 8 causes all of the plates 6, 7 and 8$^a$ to be frictionally gripped together, thus causing power to be transmitted from the fly wheel through said plates, to the plate 5 and the shaft 3.

Figure 5:
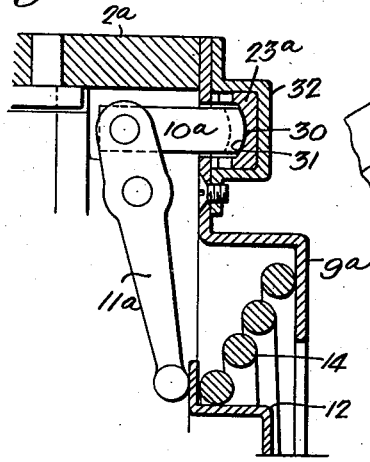
Fig. 5 is a fragmentary central longitudinal section of a clutch illustrating a modification of the invention.
Figure 6:
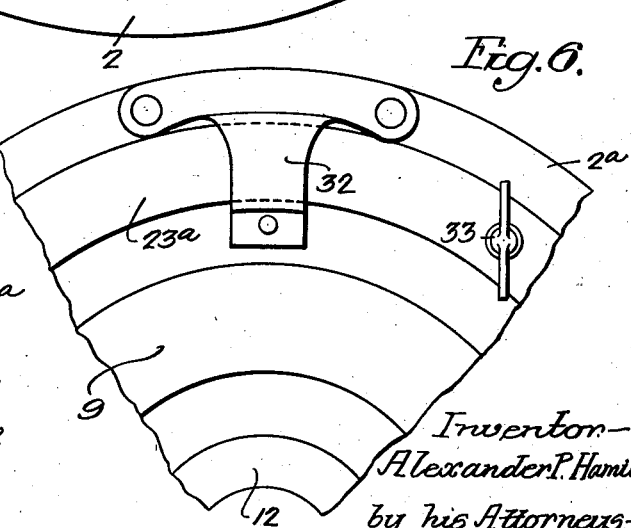
Fig. 6 is an elevation of the outside of the clutch structure shown in Fig. 5.

In that modification of my invention shown in Figs. 5 to 7 inclusive, I pivot to the outer or short arms of each of the actuating levers 11$^a$ a pin 10$^a$, having one end extended through the cover plate 9$^a$. In this case as before I provide a single adjusting ring 23$^a$ rotatably mounted upon the outside surface of the cover plate and having in its under face recesses 30 each formed with an inclined wall or cam face 31 designed to engage the properly shaped outer end of one of the pins 10$^a$. In this case the ring is guided by and rotatable within a suitable number of guide or bridge members 32, and one or more conveniently operative screws 33 which when set up will clamp said ring 23$^a$ in any adjusted position.

When the adjusting ring is rotated in one direction, all of the fulcrum pins 10$^a$ are forced further into the clutch casing and may be brought to any positions required to insure the proper engagement and gripping together of the rings or plates, etc., of the clutch under operating conditions. Thereafter one or more thumb screws 33 carried by the ring may be set up to engage the cover plate and retain said ring in position, and from time to time the latter may be similarly adjusted to compensate for the wear of the clutch plates.

From the above description it will be appreciated that I am enabled to determine and carefully regulate the adjustment of the plates of the clutch, since their condition may be easily observed from an inspection of the position of the adjusting ring, which by virtue of its construction and arrangement, insures that all of the studs or fulcrum pins shall be equally set up by any particular adjustment. Moreover the adjustment may be performed with the utmost convenience and with but little expenditure of time,—the various parts being substantial, simple and of an inexpensive nature, not likely to require attention or get out of order under conditions of operation.

I claim:

1. The combination in a clutch of a casing; clutch elements therein; means including levers for controlling the operation of said elements, fulcrum pins for the levers longitudinally adjustable through the casing; with a cam ring mounted on the outside of the casing and coacting with the pins to determine their longitudinal positions.

2. The combination in a clutch of a casing; clutch elements therein; means including levers for controlling the operation of said elements; fulcrum pins for the levers adjustably mounted in the casing; with a ring slotted to receive the pins and having similar cam surfaces respectively adjacent thereto for determining the longitudinal adjustment of said pins.

3. The combination in a clutch of a casing; frictionally coacting elements in the casing; means for actuating said elements including a series of levers; studs adjustably mounted in the casing and positioned to provide fulcrums for the levers respectively; a ring rotatably mounted on the casing and formed with portions of varying height positioned to be longitudinally adjusted relatively to the studs by rotative adjustment of the ring; and means for retaining the ring in any adjusted position.

4. The combination in a clutch of a casing; coacting clutch elements therein; means including levers for controlling the operation of said elements; and means for adjusting the levers to compensate for wear of the clutch elements, the same including a ring rotatably adjustable on the outside of the casing having portions of varying thickness for determining the adjustment of the levers in lines parallel with the axis of rotation of the casing.

5. The combination in a clutch of a casing; coacting clutch elements therein; means including levers for controlling the operation of said elements; a ring mounted on the outside of the casing and having cam portions of varying thickness respectively interposed between said casing and the levers in positions to permit visible and uniform adjustment thereof to compensate for wear of the clutch elements.

6. The combination in a clutch of a casing; clutch elements therein; means including levers for controlling the operation of said elements; fulcrum pins for the levers adjustably mounted in the casing; and an adjustable ring on the outside of the casing having similar cam surfaces respectively adjacent the pins positioned to effect their uniform adjustment in lines parallel to the axis of rotation of the casing.

7. The combination in a clutch of a casing; frictionally coacting elements in the casing; means for actuating said elements including a series of levers; studs adjustable in lines substantially parallel with the casing axis and positioned to provide fulcrums for the levers respectively; a ring rotatably mounted on the outside of the casing and formed with stepped portions for the reception of the studs; and means for retaining the ring in any adjusted position.

8. The combination in a clutch of a casing; coacting clutch elements and a pressure plate in said casing; levers mounted to operate on the pressure plate to cause operative engagement of the clutch elements; a ring on the outside of the casing having portions of varying thickness for determining the uniform adjustment of the fulcrums of said levers; and means for holding said ring in any adjusted position.

9. The combination in a clutch of a casing adapted to be connected to one of two shafts and having a friction surface; a pressure plate slidably movable within the casing also having a friction surface; at least one friction member adapted to be attached to a second shaft and engageable between the casing and the pressure plate; a cover plate attached to the casing; spring means acting between the pressure plate and the casing structure; means for controlling the action of said spring means including levers; and means for adjusting the levers to compensate for the wear of the friction surfaces, the same including an adjustable member on the outside of the casing having portions of varying thickness for determining the uniform adjustment of said levers.

In witness whereof I affix my signature.

ALEXANDER P. HAMILTON.